United States Patent Office 3,555,884
Patented Jan. 19, 1971

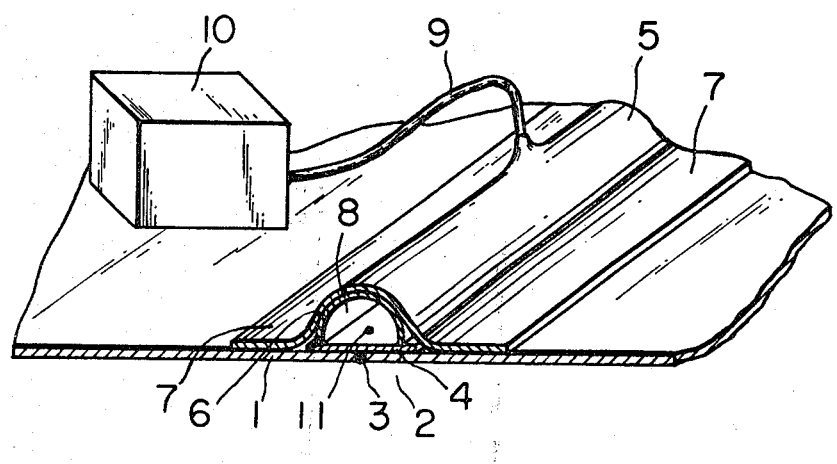

3,555,884
METHOD OF TESTING AIRTIGHTNESS OF HERMETICALLY SEALED TANKS
Katsuro Yamamoto and Takuya Hatano, Tokyo, Kuniyoshi Obata, Kawasaki, Tohru Satoh, Yokohama, and Shinji Nakagawa, Kasukabe, Japan, assignors to Bridgestone Liquefied Gas Company Limited, Tokyo, Japan
Filed Dec. 27, 1968, Ser. No. 787,532
Int. Cl. G01m 3/20
U.S. Cl. 73—40.7           3 Claims

ABSTRACT OF THE DISCLOSURE

Method of testing airtightness of hermetically sealed tanks is disclosed wherein a gas permeable strip impregnated with a detecting substance is arranged on that portion of a wall plate of a hermetically sealed tank which includes defects and a gas to be detected introduced in a space present at the side of the wall plate opposite to said strip is caused to leak through said wall portion including defects. The detecting substance reacts with the gas to be detected and becomes changed, for instance, in color whereby the leakage of gas through said wall plate is detected by observing the change of the detecting substance.

---

This invention relates to a method of testing airtightness of hermetically sealed tanks.

Heretofore, it has been proposed to test airtightness of hermetically sealed tanks by introducing gas such as air, nitrogen etc. under pressure into a tank, applying soap water upon the outer surface of the tank, and foaming the soap water, whereby the leakage of gas from the tank is detected.

But, such method could not be applied to a tank whose outer surface is inaccessible, for example, a tank having a flat bottom surface located on the ground and required to detect the leakage of gas from the bottom surface of the tank. In this case, use has been made of a vacuum box and that portion of the inner surface of the tank which is to be detected is applied with the soap water and then covered by a vacuum box having a window made of a transparent material such as glass etc. The inner space of the vacuum box is evacuated by means of a vacuum pump to a desired degree of vacuum thus foaming the soap water by the action of air leaking from outside of the tank into the vacuum box. Thus, it is possible to observe this foaming of the soap water through the window of the vacuum box and hence detect the leakage of gas through the inner surface of the tank from outside.

The above mentioned method is capable of detecting the leakage of gas through the inner surface of the tank from outside, but has the disadvantage that the small vacuum box can only detect the leakage of gas through that small portion of the inner surface of the tank which is covered by the small vacuum box and hence the small vacuum box must be moved throughout the total area of the inner surface of the tank, thereby making the method considerably troublesome and complex. Moreover, if the tank is provided at its inner surface with specially shaped corners, use must be made of a vacuum box specially designed so as to fit in such corners. The operation of bringing the vacuum box into contact with the vertical wall, ceiling etc. of the tank becomes also considerably difficult.

The above mentioned conventional methods making use of soap water do not provide a positive way of detecting the leakage of gas from hermetically sealed tanks since the soap water would disappear within a short time. Moreover, the detectable amount of the leakage of gas is limited. That is, it is impossible to detect a very little amount of the leakage of gas by investigating the foaming effect of the soap water.

A method of using a special device for detecting the leakage of gas through the tank wall with the aid of a gas such as freon gas has also been proposed. But, such method is also not positive in detecting the minute amount of the leakage of gas.

The principal object of the invention is to provide a method of testing airtightness of hermetically sealed tanks enabling a detection of minute leakage of gas which cannot be detected by the conventional method, to be simply obtained and having the additional advantage that the detection can be effected by an operator in a very simple manner with less fatigue and without necessitating any skillfulness.

Another object of the invention is to provide a method of testing airtightness particularly adapted for use in thin film type tanks.

A thin film type tank comprises an outer vessel of pressure resistant construction and an inner vessel made of a thin film. The inner vessel is adapted to prevent leakage of liquid enclosed therein only and when subjected to the liquid pressure is deflected towards the outer vessel and hence brought into contact with a heat insulating layer secured to the inner surface of the outer vessel, with the result that the liquid pressure is supported by the outer vessel of pressure resistant construction.

This type of tank is provided at outside the inner vessel with the heat insulating layer or the outer vessel so that it is impossible to apply the above mentioned conventional method as to apply pressure against the inner vessel and paint soap water etc. on the outer surface of the tank in order to detect the leakage of gas from the tank. Even if a space formed between the outer and inner vessels is subjected to the pressure for the purpose of detecting the leakage of gas from the inner vessel, the inner vessel could not withstand such pressure so that a low pressure only is introduced in the space formed between the outer and inner vessels which would not be satisfied for positive detection of the leakage of gas. Moreover, the method of using the vacuum box has the above mentioned disadvantage.

In accordance with the invention, in case of detecting the leakage of gas from the inner vessel of the above mentioned thin film type tank certain gas to be detected is introduced into a space formed between outer and inner vessels such that the space is filled with a gas containing said gas to be detected such as a mixed gas of air and the gas to be detected. The pressure of this mixed gas is determined to a value which is a little higher than that of a gas present at other side of the wall plate such that the inner vessel can withstand the pressure without any deformation. The inner vessel is provided on its inner surface with a strip consisting of a substance permeable to gas such, for example, as filter cloth and filter paper and impregnated with a detecting substance which reacts with the gas to be detected and then becomes changed. If there occurs the leakage of gas from the inenr vessel, the detecting substance impregnated in the strip positioned at that portion of the inner vessel through which the leakage occured becomes changed, for example, discolored whereby the leakage of gas can easily be detected by investigating such discoloration of the strip.

According to the invention, the change of the detecting substance does not depend on the rate of the leakage or the amount of the leakage of gas per unit time, but is proportional to the integrated value of the amount of leakage or the total amount of the leakage of gas. Thus, even when the amount of the leakage of gas per unit time is minute, the change of the detecting substance is gradually accumulated if it is remained as it was for a long time, until the change of the detecting substance becomes conspicuous, with the result that such minute leakage of gas can be detected in a simple and easy manner.

The conventional methods cause the soap water to foam in dependence with the rate of the leakage of gas so that it is impossible to detect the leakage of gas when it is occured through very small holes or when pressure difference produced between the inner and outer surfaces of the inner vessel is not sufficient enough to obtain reasonable speed of the leakage of gas. Moreover, the conventional methods must satisfy such condition that the operator has to observe a phenomenon occurring within a very short time such as foaming of the soap water so that the operator could not always detect the leakage of gas completely even though he is skilled in the art and has made considerable efforts.

In the invention use may be made of hydrogen sulfide gas as the gas to be detected. In this case lead acetate may be used as the detecting substance. The lead acetate reacts with the hydrogen sulfide in an extremely intense manner and becomes discolored into black brown color. Thus, it is possible to detect the leakage of gas in a simple and easy manner. Various other combinations of the gas to be detected and the detecting substance may be made, examples of which are as follows.

| Gas to be detected | Detecting substance | Discoloration |
| --- | --- | --- |
| Ammonia | Nessler's reagent | From colorless to brown color. |
| Ethylene or propylene | Tetranitromethane | From colorless to black brown color. |
| Fourfural | Aniline acetate | From colorless to red black color. |

In the above examples, the changes of the detecting substances are discoloration. But, use may also be made of a detecting substance which reacts with the gas to be detected and then radiates fluorescent light. Alternatively, use may be made of a gas to be detected containing radioactive isotope. In this case the change of radioactivity of the detecting substance may be measured.

For a better understanding of the invention, reference is taken to the accompanying drawing, of which a single figure is a perspective view illustrating an embodiment of the method according to the invention. Referring to the drawing, 1 represents a wall plate of an inner vessel of a thin film type tank. In a space formed between inner and outer vessel, i.e. a space 2 below the wall plate 1 shown in the drawing is introduced a gas to be detected such as hydrogen sulfide gas according to the invention. 3 designates a portion where adjoining wall plates 1, 1 are welded together. Leakage of gas mainly occurs through this welded portion 3, so that it is sufficient to test the welded portion 3 such that the gas to be detected in the space 2 leaks therethrough or not. 4 represents a strip made of filter paper, filter cloth, etc. arranged on the welded portion 3 so as to cover it. The strip 4 is impregnated with a detecting substance such as lead acetate. The strip 4 may preferably be adhered to the wall plate 1 by means of adhesives etc. If pinholes or cracks exist in the welded portion 3, the gas to be detected in the space 2 leaks into the inner vessel and the hydrogen sulfide in the gas reacts with the detecting substance or lead acetate impregnated in the strip 4 to discolor that portion of the strip 4 which is positioned on the defects into black brown. 11 shows this discolored portion. If a small amount of the gas to be detected in the space 2 leaks into the inner vessel so that the strip 4 is not discolored immediately upon the occurrence of leakage, it is only necessary to remain the strip 4 as it was for a long time. For example, if the strip 4 adhered to the wall plate 1 is remained as it was for 24 hours until it becomes discolored, then it is possible to carefully investigate such discoloration and hence detect any minute leakage of gas in a simple and easy manner.

If it is desired to detect the leakage of gas within a short time, that portion of the wall plate 1 which is covered by the strip 4 is enclosed in a gas impermeable sheet 5 such as a vinyl sheet etc. and a space formed between the sheet 5 and the wall plate 1 is evacuated to a desired degree of vacuum. In this case, a spacer member 6 in the form of a trough, for example, is inserted between the sheet 5 and the wall plate 1 for the purpose of preventing the sheet 5 from being closely in contact with the wall plate 1. The pressure difference produced between the outer and inner surfaces of edge portions 7, 7 of the sheet 5 holds these portion urged against the wall plate 1 to hermetically seal a space if formed therebetween. An enclosed space 8 between the sheet 5 and the wall plate 1 is evacuated through a pipe 9 by means of a vacuum pump 10 to a desired degree of vacuum. The edge portions 7, 7 of the sheet 5 may preferably be adhered to the wall plate 1 with the aid of adhesives. After the enclosed space 8 has been maintained in vacuum for a given period, the sheet 5 and the spacer 6 are removed and the discoloration of the strip 4 is investigated. Thus, it is possible to detect any minute leakage within a short time in a simple and easy manner.

Alternatively, the wall plate 1 may be subjected to beats in a slight degree or vibration with the aid of a vibrator in place of using the sheet 5 and evacuating the enclosed space 8 by means of the vacuum pump 10. In this case, the pressure difference between the outer and inner sides of the wall plate 1 is not always necessary. The vibrations given to the wall plate 1 admit the leakage of the gas to be detected in the space 2 through the defects in the wall plate 1 into the inner vessel. This method of making use of the vibrations of the wall plate 1 is capable of removing foreign matters which close minute defects and prevent the leakage of the gas to be detected in the space 2 through the minute defects and hence admitting the leakage of the gas to be detected in the space 2 through thus opened defects into the inner vessel 1 thereby completely detecting the defect in the wall plate 1.

As explained hereinbefore the method according to the invention ensures detection of extremely minute leakage in a very simple and easy manner without necessitating any skilled operator and further provides the important advantage that the operator is not fatigued, that a number of defects can be detected at the same time without detecting such defects one by one as has been done by the conventional method of using a vacuum box, and that defects along a long welding seam can also be detected at one time.

It may be clear that the invention is not restricted to the embodiments shown and described and that many variations are possible for those skilled in the art without leaving the scope of the invention.

What is claimed is:

1. A method of testing airtightness of hermetically sealed tanks comprising introducing into one side of a wall plate of a hermetically sealed tank a gas to be detected under pressure which is a little higher than that of a gas present at other side of the wall plate, arranging at other side of the wall plate a gas permeable strip impregnated with a detecting substance which reacts with said gas to be detected and then becomes changed, covering said gas permeable strip with a gas impermeable flexible sheet having edge portions in contact with said wall plate, inserting a spacer member between said gas permeable strip and the gas impermeable flexing sheet to form a space, evacuating said space to cause the leakage of gas to be detected thereby causing change of said detecting substance, and investigating the change occurring in said detecting substance whereby the leakage of gas through said wall plate is detected.

2. A method of testing airtightness of hermetically sealed tanks comprising arranging at one side of a wall plate of a hermetically sealed tank a gas permeable strip impregnated with a detecting substance, introducing into the other side of the wall plate a gas to be detected which reacts with said detecting substance and causes change of said detecting substance, vibrating said wall plate by beating or with the aid of a vibrator whereby leakage of said gas to be detected through a defect in said wall plate is encouraged and foreign matter which may close minute defects and prevent the leakage of said gas are removed, and investigating the change occurring in said detecting substance whereby the leakage of gas through said wall plate is detected.

3. A method as claimed in claim 2, further including covering said gas permeable strip with a gas permeable flexible sheet having edge portions in contact with said wall plate, inserting a spacer member between said gas permeable strip and said gas impermeable flexible sheet to form a space, and evacuating said space.

References Cited
UNITED STATES PATENTS

| | | | |
|---|---|---|---|
| 2,601,840 | 7/1952 | Smith et al. | 73—40.5 |
| 2,703,978 | 3/1955 | Baxter | 73—40.7 |
| 2,918,893 | 12/1959 | Norton | 116—114.19 |
| 3,203,229 | 8/1965 | Pevar | 73—40 |
| 3,353,401 | 11/1967 | Hessler | 73—37 |

S. CLEMENT SWISHER, Primary Examiner

U.S. Cl. X.R.

73—49.3